(12) United States Patent
Kuwata (10) Patent No.: US 9,041,265 B2
(45) Date of Patent: May 26, 2015

(54) MAGNETIC BEARING DEVICE

(75) Inventor: Gen Kuwata, Tokyo (JP)

(73) Assignee: IHI Corporation, Tokyo (JP)

( * ) Notice: Subject to any disclaimer, the term of this patent is extended or adjusted under 35 U.S.C. 154(b) by 771 days.

(21) Appl. No.: 13/001,510

(22) PCT Filed: Apr. 21, 2009

(86) PCT No.: PCT/JP2009/057914
§ 371 (c)(1),
(2), (4) Date: Dec. 27, 2010

(87) PCT Pub. No.: WO2009/157252
PCT Pub. Date: Dec. 30, 2009

(65) Prior Publication Data
US 2011/0101808 A1 May 5, 2011

(30) Foreign Application Priority Data

Jun. 27, 2008 (JP) ................................. 2008-168736

(51) Int. Cl.
*F16C 32/04* (2006.01)
*H02K 7/09* (2006.01)

(52) U.S. Cl.
CPC .......... *F16C 32/0459* (2013.01); *F16C 32/0461* (2013.01); *F16C 32/048* (2013.01); *F16C 2240/40* (2013.01); *F16C 2300/22* (2013.01)

(58) Field of Classification Search
CPC ....... H02K 7/09; F16C 32/044; F16C 32/0459
USPC ........................................................ 310/90.5
See application file for complete search history.

(56) References Cited

U.S. PATENT DOCUMENTS 6,194,800 B1 * 2/2001 Maruyama et al. .......... 310/90.5
6,831,385 B2 * 12/2004 Hasegawa et al. ........... 310/90.5
(Continued)

FOREIGN PATENT DOCUMENTS

| EP | 0941416 A1 | 9/1999 |
|---|---|---|
| EP | 1411255 A1 | 4/2004 |

(Continued)

OTHER PUBLICATIONS

Search Report issued in corresponding European Application No. 09769962.3 dated May 19, 2011 and mailed May 27, 2011.
(Continued)

*Primary Examiner* — Burton Mullins
(74) *Attorney, Agent, or Firm* — Griffin & Szopl, P.C.

(57) ABSTRACT

Provided is a magnetic bearing device capable of facilitating manufacture of the magnetic bearing device and improving precision in production thereof while maintaining eddy current reducing effects. The magnetic bearing device 10 supporting a rotating shaft 3 with a magnetic force includes a plurality of magnetic poles 5 arranged in the circumferential direction of the rotating shaft 3. Each magnetic pole 5 includes an inner end surface 5b facing the outer surface of the rotating shaft in proximity thereto. The magnetic poles which are adjacent to each other in the circumferential direction respectively extend in the axial directions of the magnetic poles 5 to the inner end surfaces 5b of the magnetic poles so as to virtually interfere with each other in the vicinity of the outer surface of the rotating shaft. The virtual interfering portions 5a of both the magnetic poles 5 capable of interfering with each other are removed by cutting.

5 Claims, 6 Drawing Sheets

(56) References Cited

U.S. PATENT DOCUMENTS

| | | | | |
|---|---|---|---|---|
| 6,940,205 | B1 * | 9/2005 | Murakami et al. | ......... 310/254.1 |
| 2008/0073993 | A1 | 3/2008 | Sortore et al. | |

FOREIGN PATENT DOCUMENTS

| | | | |
|---|---|---|---|
| JP | 10061666 | A | 3/1998 |
| JP | 2001041239 | A | 2/2001 |
| JP | 2001504926 | T | 4/2001 |
| JP | 2001271836 | A | 10/2001 |
| WO | 9823876 | A1 | 6/1998 |

OTHER PUBLICATIONS

Search Report issued in corresponding International Application No. PCT/JP2009/057914, completed May 18, 2009, mailed Jun. 2, 2009.
Heteropolar, Oxford Dictionary (2013), available at http://www.oxforddictionaries.com/us/definition/american_english/heteropolar (downloaded Nov. 7, 2013, 3:58 PM).
Homopolar, Oxford Dictionary (2013), available at http://www.oxforddictionaries.com/us/definition/american_english/homopolar?q=homopolar (downloaded Nov. 7, 2013, 4:01 PM).

* cited by examiner

MAGNETIC BEARING DEVICE

This is a National Phase Application in the United States of International Patent Application No. PCT/JP2009/057914 filed Apr. 21, 2009, which claims priority on Japanese Patent Application No. 2008-168736, filed Jun. 27, 2008. The entire disclosures of the above patent applications are hereby incorporated by reference.

BACKGROUND OF THE INVENTION

1. Technical Field of the Invention

The present invention relates to a magnetic bearing device.

2. Description of the Related Art

A magnetic bearing device has a rotating shaft which is a rotor, and magnetic poles which are provided at a stator to surround the rotating shaft and supports the rotating shaft in a non-contact manner with a magnetic force.

The rotating shaft is formed using a magnetic material, and is, for example, a rotating shaft of a turbo compressor, a cryogenic rotary machine, a turbo charger, a flywheel, or the like which rotates at high speed. A plurality of magnetic poles is arranged in the circumferential direction so as to surround the rotating shaft. In addition, in the present invention, the circumferential direction indicates the circumferential direction of the rotating shaft.

Figure 1A:
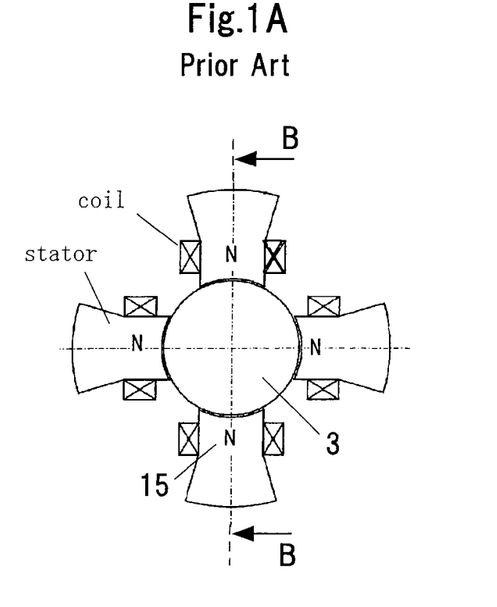
FIGS. 1A and 1B are configuration views of a homo-polar magnetic bearing device.
Figure 1B:
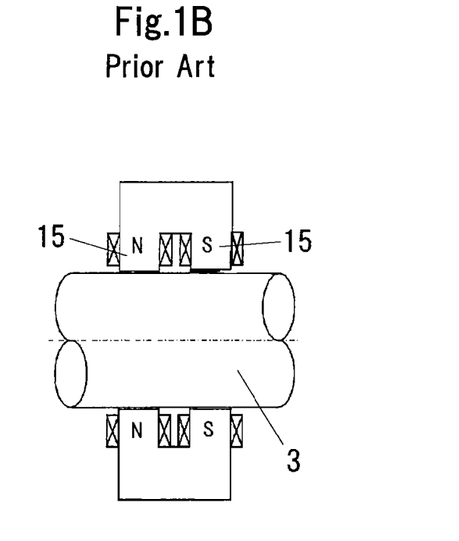

FIGS. 1A and 1B are configuration views of a homo-polar magnetic bearing device. FIG. 1B is a sectional view taken along the line B-B of FIG. 1A.

As illustrated in FIGS. 1A and 1B, a plurality of magnetic poles 15 is arranged in the circumferential direction so as to surround the rotating shaft 3. The rotating shaft 3 is floated and supported in a non-contact manner by passing a magnetic flux through the rotating shaft 3 which is being rotated at high speed from the magnetic poles 15 and by the magnetic attractive force thereof.

Figure 2A:
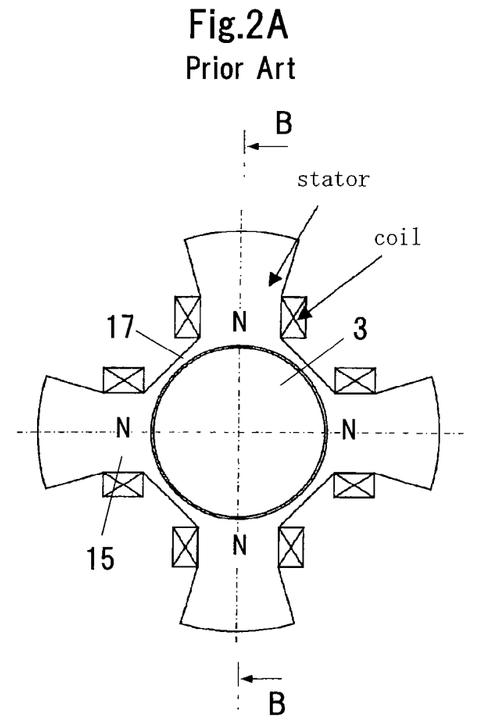
FIGS. 2A and 2B are configuration views of a magnetic bearing device of Patent Document 1.
Figure 2B:
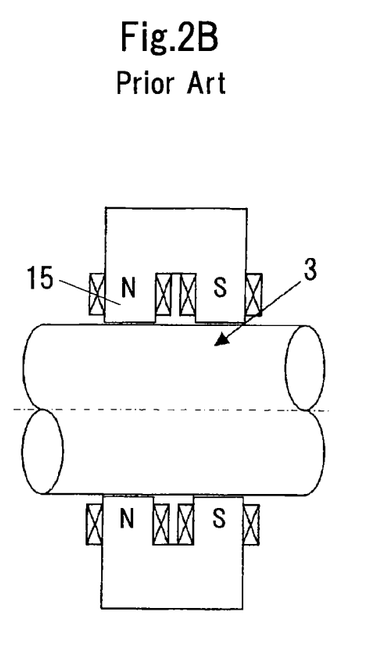
Figure 3A:
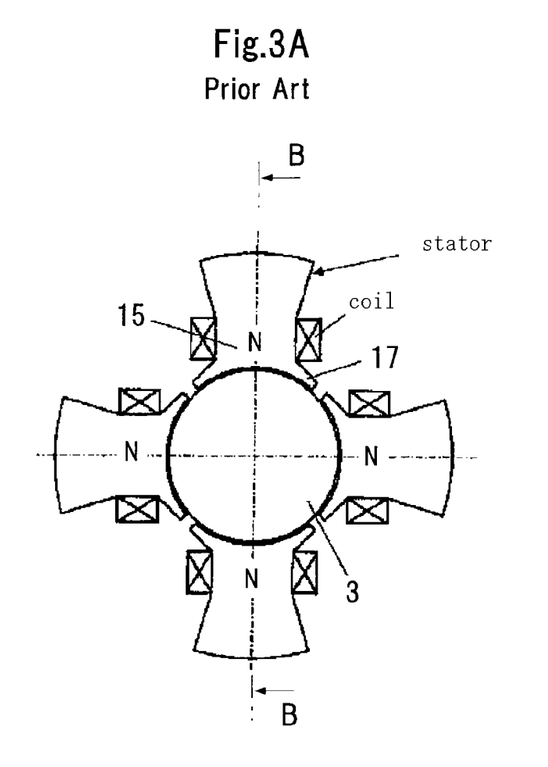
FIGS. 3A and 3B are other configuration views of the magnetic bearing device of Patent Document 1.
Figure 3B:
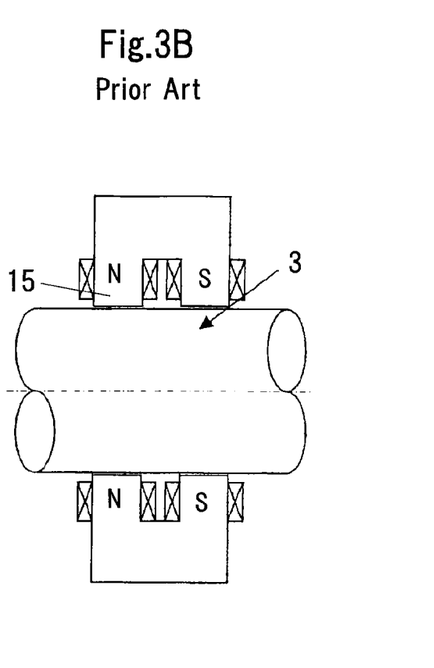

In the homo-polar magnetic bearing device, magnetic poles 15 of the same polarity (N-pole in FIG. 1A) are lined up in the circumferential direction of the rotating shaft 3 as illustrated in FIG. 1A, and an N-pole and an S-pole are lined up in the axial direction of the rotating shaft 3 as illustrated in FIG. 1B. As shown in FIG. 1A, adjacent magnetic poles 15 which are lined up in the circumferential direction are not close to each other. Thus, the intensity distribution of the magnetic field occurs between a portion with the magnetic poles 15 and a portion with no magnetic pole. Thus, an eddy current is generated so as to locally cancel out fluctuations in magnetic flux on the surface of the rotating shaft, in the circumferential direction. That is, an electromotive force which causes generation of an eddy current is shown by the following Formula (1). Even when magnetic flux density (magnetic field B) is small, a large eddy current will be generated when the rotating shaft rotates at high speed as in a high-speed rotating shaft.

$$e \propto B \cdot v \cdot L \quad (1)$$

e: electromotive force, B: magnetic flux density, v: speed of traversing magnetic field, and L: length of conductor FIGS. 2A and 2B and FIGS. 3A and 3B show the configuration of the magnetic bearing device of Patent Document 1. FIGS. 2B and 3B are sectional views taken along the lines B-B of FIGS. 2A and 3A, respectively. In Patent Document 1, in the homo-polar magnetic bearing device, an overhang portion 17 is provided, and N-poles 15 which are adjacent to each other in the circumferential direction are connected to each other in the circumferential direction (the case of FIGS. 2A and 2B), or brought close to each other (the case of FIGS. 3A and 3B). Thereby, the magnetic field flux density at an intermediate position between the magnetic poles 15 which are adjacent to each other in the circumferential direction are increased to reduce occurrence of the intensity distribution of the magnetic flux density in the circumferential direction. Thereby, generation of an eddy current is suppressed.

Moreover, in FIGS. 2A and 2B, and FIGS. 3A and 3B, the overhang portion 17 is thinly formed. Thus, magnetic saturation of the overhang portion 17 is caused, and thereby, the magnetic flux is prevented from leaking out from one of adjacent magnetic poles 15 to the other thereof.

Patent Document 1: Japanese Patent Application Laid-Open No. 2001-271836 (Magnetic Bearing Device)

However, the thickness of the overhang portion 17 of Patent Document 1 is, for example, about 0.3 to 1 mm, and the material thereof is laminated steel sheets. Therefore, there is a possibility that the strength drops, and work during manufacture becomes difficult. In practice, it is difficult to make all the thicknesses of all of the overhang portions 17 the same, and there is a possibility that the variations in the thickness of the overhang portion 17 may increase. That is, there is a possibility that variations may occur in the magnetic resistance of the overhang portion 17.

SUMMARY OF THE INVENTION

Thus, the object of the present invention is to provide a magnetic bearing device capable of facilitating the manufacture of the magnetic bearing device and improving precision in production thereof while maintaining eddy current reducing effects.

In order to achieve the above object, according to the present invention, there is provided a magnetic bearing device supporting a rotating shaft with a magnetic force. The magnetic bearing device includes a plurality of magnetic poles arranged in the circumferential direction of the rotating shaft. Each magnetic pole has an inner end surface facing the outer surface of the rotating shaft in proximity thereto. The magnetic poles which are adjacent to each other in the circumferential direction respectively extend in the axial directions of the magnetic poles to the inner end surfaces of the magnetic poles so as to virtually interfere with each other in the vicinity of the outer surface of the rotating shaft. The virtual interference portions of both the magnetic poles capable of interfering with each other are removed by cutting.

In the magnetic bearing device of the present invention described above, a plurality of magnetic poles arranged in the circumferential direction of the rotating shaft is included. Each magnetic pole has an inner end surface facing the outer surface of the rotating shaft in proximity thereto. The magnetic poles which are adjacent to each other in the circumferential direction respectively extend in the axial directions of the magnetic poles to the inner end surfaces of the magnetic poles so as to virtually interfere with each other in the vicinity of the outer surface of the rotating shaft. The virtual interference portions of both the magnetic poles capable of interfering with each other are removed by cutting. Thus, it is possible to make the circumferential spacing between the adjacent magnetic poles smaller by the simple work of cutting off the interference portions of the magnetic poles. That is, it is possible to decrease the circumferential region in which the magnetic pole portions facing the outer surface of the rotating shaft in the circumferential direction do not exist. As a result, it is possible to suppress fluctuations in the magnetic flux on the outer surface of the rotating shaft to reduce an eddy current.

Hence, while the eddy current reducing effect may be maintained, the manufacture of the magnetic bearing device becomes easy, and the precision of the manufacture also improves.

According to a preferable embodiment of the present invention, the magnetic poles which are adjacent to each other respectively have a cut surface formed by the cutting, and the cut surface is a flat surface.

In this way, cutting work becomes simpler by making the cut surface formed by cutting off the interference portion into a flat surface.

Accordingly, according to a preferable embodiment of the present invention, the magnetic poles which are adjacent to each other respectively have a cut surface formed by the cutting, and the spacing between the cut surfaces of the adjacent magnetic poles in the circumferential direction is greater than the spacing between the inner end surface of the magnetic pole and the outer surface of the rotating shaft.

In this way, the magnetic poles which are adjacent to each other respectively have a cut surface formed by the above cutting, and the spacing between the cut surfaces of the adjacent magnetic poles in the circumferential direction is greater than the spacing between the inner end surface of the magnetic pole and the outer surface of the rotating shaft. Thus, it is possible to keep the magnetic flux from leaking from one of the adjacent magnetic poles to the other thereof. Thereby, it is possible to eliminate waste of the magnetic field generated by the magnetic pole 5 through a simple cutting work.

Moreover, it is possible to suppress the leakage of the magnetic flux as described above through a simple cutting work without precisely working the thickness of the overhanging portion 17 in Patent Document 1, According to a preferable embodiment of the present invention, the outer surface of the rotating shaft which faces the plurality of magnetic poles is circular in cross-section perpendicular to the axial direction of the rotating shaft, and the cross-section of the inner end surface perpendicular to the axial direction of the rotating shaft is made arc shaped along the circular shape.

In this way, the outer surface of the rotating shaft which faces the plurality of magnetic poles is circular in cross-section perpendicular to the axial direction of the rotating shaft, and the cross-section of the inner end surface perpendicular to the axial direction of the rotating shaft is made arc shaped along the above circular shape. Thus, it is possible to completely surround the outer surface of the rotating shaft by the inner end surface of the magnetic pole extending along the outer surface, within a range outside of a fine circumferential gap between the magnetic poles which are adjacent to each other. Thereby, it is possible to reliably suppress fluctuations in the magnetic flux on the outer surface of the rotating shaft to reduce an eddy current.

According to the invention described above, it is possible to facilitate manufacture of the magnetic bearing device and improving precision in production thereof while maintaining eddy current reducing effects.

DESCRIPTION OF THE PREFERRED EMBODIMENT

Hereinafter, the best embodiment for carrying out the present invention will be described with reference to the drawings. In addition, in the respective drawings, the same reference numerals are given to common portions, and duplicate description is omitted.

Figure 4A:
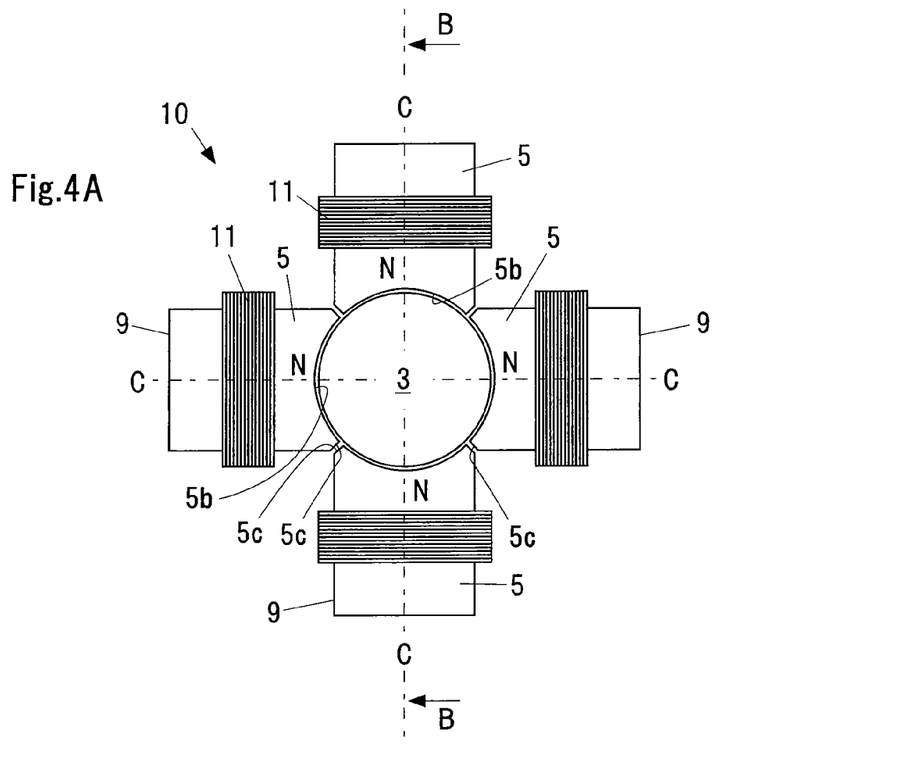
FIGS. 4A and 4B are configuration views of a magnetic bearing device according to an embodiment of the present invention.
Figure 4B:
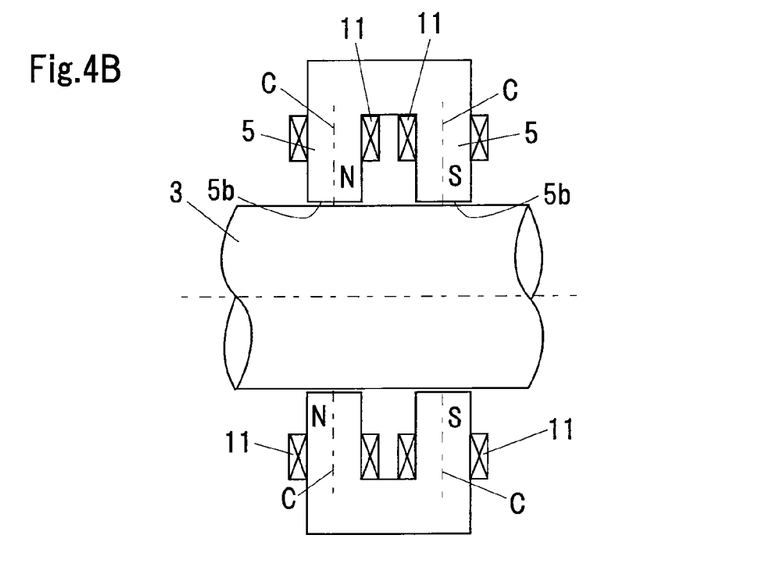

FIGS. 4A and 4B are configuration views of a magnetic bearing device 10 according to an embodiment of the present invention. FIG. 4A is a view as seen from the direction perpendicular to the axial direction of the rotating shaft 3, and FIG. 4B is a sectional view taken along the line B-B of FIG. 4A.

The magnetic bearing device 10 is a device supporting the rotating shaft 3 with a magnetic force, and includes a plurality of magnetic poles 5 arranged in the circumferential direction of the rotating shaft 3. Each magnetic pole 5 has an inner end surface 5b facing the outer surface of the rotating shaft 3 in proximity thereto, and the rotating shaft 3 is supported in a non-contact manner with a magnetic force (a magnetic force directed to the rotating shaft 3 from the magnetic pole 5, or a magnetic force generated by a magnetic field in a direction opposite to the above direction) generated between each magnetic pole 5 and the rotating shaft 3. In the example of FIGS. 4A and 4B, the magnetic bearing device 10 is of a homo-polar type in which the magnetic poles 5 with the same polarity (N-pole in FIG. 4A) in the circumferential direction. In FIG. 4B, only two upper and lower magnetic poles 5 of four magnetic poles 5 of FIG. 4A are illustrated. Additionally, in FIGS. 4A and 4B, reference numeral C designates the axis of the magnetic pole 5.

The rotating shaft 3 is formed using a magnetic material, and is, for example, a rotating shaft of a turbo compressor, a cryogenic rotary machine, a turbo charger, a flywheel, or the like which rotates at high speed. In this example, the rotating shaft 3 is a solid rotating shaft. Since the solid rotating shaft 3 is made of only a shaft material (for example, integrally molded), the rotating shaft 3 has a high rigidity.

Figure 5:
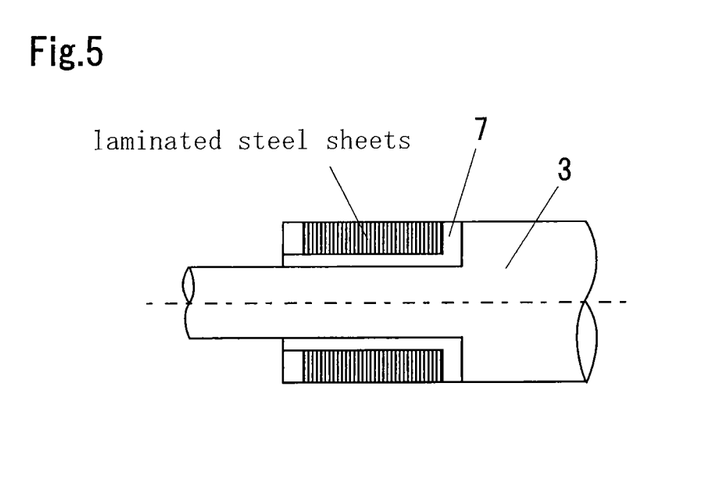
FIG. 5 is a view illustrating an example of a solid rotating shaft.

However, according to the invention, the rotating shaft 3 may be a laminated rotating shaft using laminated steel sheets. In the laminated rotating shaft, for example, as illustrated in FIG. 5, the portion of the rotating shaft facing the magnetic pole 5 is provided with a sleeve 7, and the laminated steel sheets are fixed to the rotating shaft 3 via the sleeve 7. The electrical resistance of a material is increased by making silicon be contained in the laminated steel sheets. Additionally, thin steel sheets having a thickness of about 0.1 to 0.5 mm are laminated with an insulating layer interposed. In this way, an eddy current generated in the surface of the rotating shaft is reduced compared to that in the case of the solid rotating shaft. However, since mechanical strength is low in the laminated rotating shaft, the circumferential speed of the rotating shaft may be limited.

Each magnetic pole 5 includes a stator core 9 made of, for example, laminated steel sheets. A coil 11 through which an electric current for generating a magnetic flux flow is wound around the stator core 9. In the example of FIG. 4A, each stator core 9 has two magnetic poles 5. That is, each stator core 9 has an N magnetic pole 5 and an S magnetic pole 5. In addition, the axis C of the magnetic pole 5 is the axis of the coil 11.

The outer surface of the rotating shaft 3 which faces the plurality of magnetic poles 5 is circular in cross-section perpendicular to the axial direction of the rotating shaft 3. Therefore, the cross-section of the inner end surface 5b perpendicular to the axial direction of the rotating shaft 3 is made arc shaped along the above circular shape.

The inner end surface 5b of each magnetic pole 5 are spaced apart at regular intervals from the outer surface of the rotating shaft 3 irrespective of the circumferential position of the rotating shaft 3.

According to this embodiment, the magnetic poles 5 which are adjacent to each other in the circumferential direction respectively extend to the inner end surfaces 5b of the magnetic poles 5 (that is, to a position spaced apart at regular intervals from the outer surface of the rotating shaft 3) so as to virtually interfere with each other in the vicinity of the outer surface of the rotating shaft 3, and the virtual interference portions 5a of both the magnetic poles 5 capable of interfering with each other are removed by cutting. That is, in this example, the interference portions 5a are corner portions. The interference portions 5a are illustrated in FIG. 6B.

The magnetic poles 5 which are adjacent to each other respectively have a cut surface 5c formed by the above cutting. In this embodiment, the spacing between the cut surfaces 5c of the adjacent magnetic poles 5 in the circumferential direction is greater than the spacing between the inner end surface 5b of the magnetic pole 5 and the outer surface of the rotating shaft 3. This keeps the magnetic flux from leaking from one of the adjacent magnetic poles 5 to the other thereof.

The magnetic pole 5 is fabricated, for example, as follows. First, the stator core 9 with a shape illustrated in FIG. 6A is prepared, and a portion 9a is cut from the stator core 9 with a curved surface shown by a broken line in this drawing as a cut edge. The surface formed in this way is the above-described inner end surface 5b. Next, in the stator core 9 in which the inner end surface 5b illustrated in FIG. 6B is formed, the interference portion 5a is cut with the surface shown by a broken line as a cut edge. The stator core 9 in which the interference portion 5a is cut is illustrated in FIG. 6C. Preferably, the cut surface 5c formed by cutting off the interference portion 5a is a flat surface. Thereby, cutting work becomes easy. The interference portion 5a may be cut before the inner end surface 5b is formed (that is, in the state of FIG. 6A).

Figure 6:
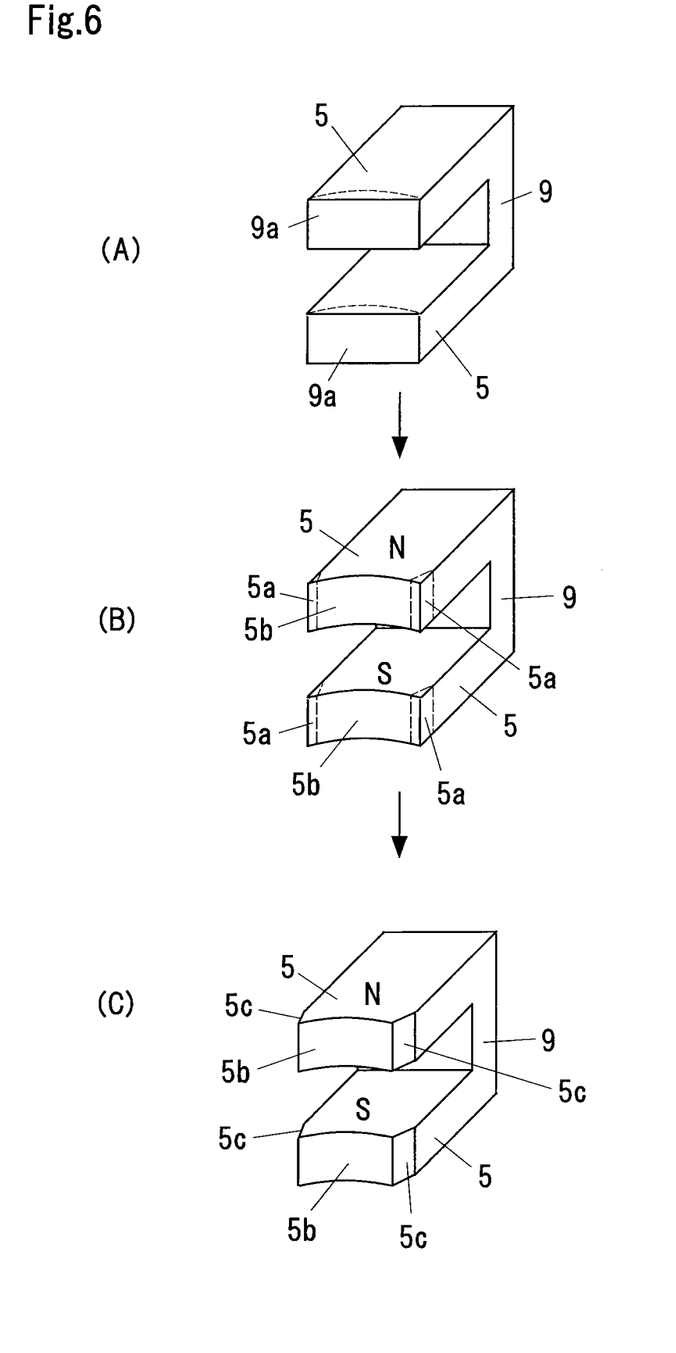
FIG. 6 is an explanatory view of manufacturing a stator core according to the embodiment of the present invention.
Figure 7:
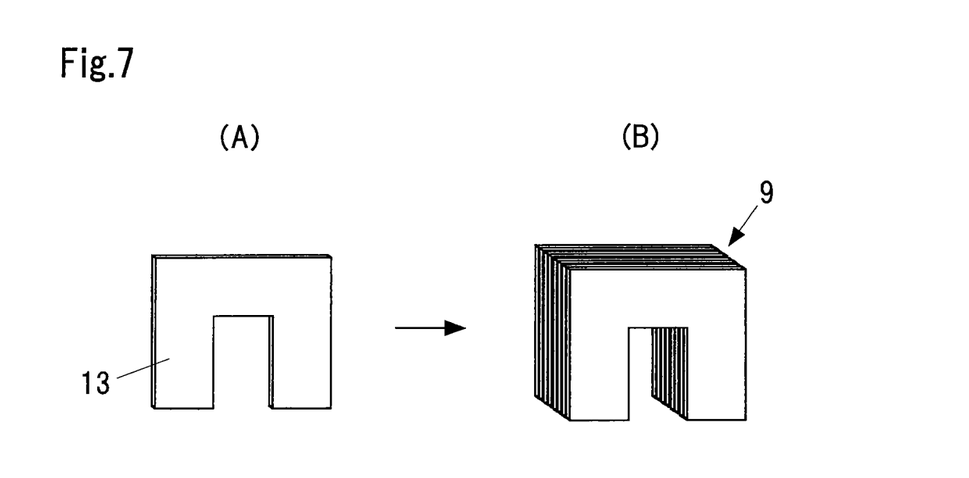
FIG. 7 is an explanatory view illustrating formation of a stator from laminated steel sheets.

In addition, the stator core 9 of FIG. 6A may be formed from laminated steel sheets. In this case, it is possible to form the stator core 9 including laminated steel sheets illustrated in FIG. 7B by superimposing a plurality of the steel sheets 13 illustrated in FIG. 7A.

According to the magnetic bearing device 10 according to the embodiment of the invention described above, the following effects (1) to (3) are obtained.

(1) The magnetic poles 5 which are adjacent to each other in the circumferential direction respectively extend in the axial directions of the magnetic poles 5 to the inner end surfaces 5b of the magnetic poles 5 so as to virtually interfere with each other in the vicinity of the outer surface of the rotating shaft 3, and the virtual interference portions 5a of both the magnetic poles 5 capable of interfering with each other are removed by cutting. Thus, it is possible to make the circumferential spacing between the adjacent magnetic poles 5 fine by the simple work of cutting the interference portions 5a of the magnetic poles 5. That is, it is possible to decrease a circumferential region where the portion of the magnetic pole 5 which faces the outer surface of the rotating shaft 3 in the circumferential direction doesn't exist. As a result, it is possible to suppress fluctuations in the magnetic flux on the outer surface of the rotating shaft 3 to reduce an eddy current. Accordingly, even if the solid rotating shaft 3 where an eddy current is apt to be generated is used, it is possible to sufficiently reduce the eddy current. Hence, while the eddy current reducing effect is maintained, the manufacture of the magnetic bearing device 10 becomes easy, and the precision of the manufacture also improves.

(2) Additionally, cutting work becomes simpler by making the cut surface 5c formed by cutting off the interference portion 5a into a flat surface.

(3) The magnetic poles 5 which are adjacent to each other respectively have a cut surface 5c formed by the above cutting, and the spacing between the cut surfaces 5c of the adjacent magnetic poles 5 in the circumferential direction is greater than the spacing between the inner end surface 5b of the magnetic pole 5 and the outer surface of the rotating shaft 3. Thus, it is possible to keep a magnetic flux from leaking out from one of the adjacent magnetic poles 5 to the other thereof. Thereby, it is possible to eliminate waste of the magnetic field generated by the magnetic pole 5 by applying an electric current to the coil 11.

(4) The outer surface of the rotating shaft 3 which faces the plurality of magnetic poles 5 is circular in cross-section perpendicular to the axial direction of the rotating shaft 3, and the cross-section of the inner end surface 5b perpendicular to the axial direction of the rotating shaft 3 is made arc shaped along the above circular shape. Thus, it is possible to completely surround the outer surface of the rotating shaft 3 by the inner end surface 5b of the magnetic pole 5 extending along the outer surface, within a range outside of a fine circumferential gap between the magnetic poles 5 which are adjacent to each other. Thereby, it is possible to reliably suppress fluctuations in the magnetic field on the outer surface of the rotating shaft 3 to reduce an eddy current.

The present invention can be applied not only to a plurality of N magnetic poles 5 which is arranged in the circumferential direction on the left of FIG. 4B, but also to a plurality of S magnetic poles 5 which is arranged in the circumferential direction on the right of FIG. 4B.

Additionally, in the above-described embodiment, the magnetic bearing device 10 is a magnetic bearing device of a homo-polar magnetic pole arrangement. However, the invention can also be applied to other types (for example, a heteropolar magnetic pole arrangement) of magnetic bearing devices.

Additionally, the stator core 9 includes laminated steel sheets in the above-described embodiment. However, according to the present invention, the stator core 9 is other suitable stator cores, such as a stator core made of a cut core or an amorphous material, or a stator core obtained by molding a powdered magnetic material.

According to the present invention, the number of the magnetic poles 5 which are arranged around the rotating shaft 3 may be a suitable number of four or more.

It is needless to say that the present invention is not limited to the above-described embodiment, and can be variously changed without departing from the concepts of the present invention.

The invention claimed is:

1. A homo-polar magnetic bearing device supporting a rotating shaft with a magnetic force, the magnetic bearing device comprising:
   a plurality of magnetic poles arranged in the circumferential direction of the rotating shaft,
   wherein each magnetic pole has an inner end surface facing an outer surface of the rotating shaft in proximity thereto, wherein magnetic poles of the same polarity are arranged adjacent to and apart from each other in the circumferential direction and respectively extend only in radially inward directions of the magnetic poles from coil wound points to inner end surfaces of the magnetic poles so as to interfere with each other in the vicinity of an outer surface of the rotating shaft, thereby forming virtual interference portions, and wherein virtual interference portions are removed by cutting, thereby defining a flat cut surface on each of the magnetic poles.

2. The home-polar magnetic bearing device according to claim 1, wherein the spacing between the cut surfaces of the adjacent magnetic poles in the circumferential direction is greater than the spacing between the inner end surface of the magnetic pole and the outer surface of the rotating shaft.

3. The home-polar magnetic bearing device according to claim 2, wherein the outer surface of the rotating shaft which faces the plurality of magnetic poles is circular in cross-section perpendicular to the axial direction of the rotating shaft, and wherein the cross-section of the inner end surface perpendicular to the axial direction of the rotating shaft is made arc-shaped along the circular shape.

4. The homo-polar magnetic bearing device according to claim 1, wherein the outer surface of the rotating shaft which faces the plurality of magnetic poles is circular in cross-section perpendicular to the axial direction of the rotating shaft, and wherein the cross-section of the inner end surface perpendicular to the axial direction of the rotating shaft is made arc-shaped along the circular shape.

5. The homo-polar magnetic bearing device according to claim 4, wherein the spacing between the cut surfaces of the adjacent magnetic poles in the circumferential direction is greater than the spacing between the inner end surface of the magnetic pole and the outer surface of the rotating shaft.

* * * * *